Feb. 6, 1962 H. A. MILLER, JR 3,019,804
FLUID FLOW AND PRESSURE CONTROL SYSTEMS
Filed Jan. 5, 1959 4 Sheets-Sheet 1

INVENTOR.
HENRY A. MILLER JR.

BY
ATTORNEY & AGENT

Feb. 6, 1962 H. A. MILLER, JR 3,019,804
FLUID FLOW AND PRESSURE CONTROL SYSTEMS
Filed Jan. 5, 1959 4 Sheets-Sheet 2

INVENTOR.
HENRY A. MILLER JR.
BY
H. Hume Mathews
Milford F. Tietze
ATTORNEY & AGENT Feb. 6, 1962 H. A. MILLER, JR 3,019,804
FLUID FLOW AND PRESSURE CONTROL SYSTEMS
Filed Jan. 5, 1959 4 Sheets-Sheet 3

*INVENTOR.*
HENRY A. MILLER JR.
BY
H. Hume Mathews
Milford F. Tietze
ATTORNEY & AGENT Feb. 6, 1962 H. A. MILLER, JR 3,019,804
FLUID FLOW AND PRESSURE CONTROL SYSTEMS
Filed Jan. 5, 1959 4 Sheets-Sheet 4

INVENTOR.
HENRY A. MILLER JR.
BY
H. Hume Mathews
Milford F. Tietze
ATTORNEY & AGENT 3,019,804
FLUID FLOW AND PRESSURE CONTROL SYSTEMS
Henry A. Miller, Jr., Scotch Plains, N.J., assignor to Air Reduction Company, Incorporated, New York, N.Y., a corporation of New York
Filed Jan. 5, 1959, Ser. No. 784,987
19 Claims. (Cl. 137—64)

The invention relates to means for controlling or regulating the flow and pressure of a fluid in a vessel, and is more particularly directed to improved means for controlling the flow and pressure of a gas in a suit for aircraft personnel.

During level flight in a pressurized aviation suit, it is necessary to introduce breathing gases or oxygen into the suit, or the loop circuit including the suit, at a rate equal to the rate of human consumption. During a dive, a relatively large quantity of gas must be delivered to the loop circuit in order to rapidly pressurize the suit, and during a climb, a large amount of gas must be vented to de-pressurize the suit. Where, for example, a minimum pressure of 5 p.s.i.a. is to be maintained in the loop circuit, the pressure of the ambient atmosphere is not available for controlling or regulating the supply and relief of gas to and from the loop circuit above an equivalent or critical altitude of 27,500 feet; the supply and relief of gas to and from the loop circuit, and control of the pressure within the loop circuit, must be provided for in some other manner.

An object of the invention is to provide means for controlling the pressure in a vessel by utilizing the flow of fluid into and out of the vessel to maintain a desired predetermined pressure within the vessel at a differential with respect to varying ambient pressure during one phase; and, during a second or so-called absolute phase, to maintain the desired vessel pressure independently of ambient pressure variation, the two phases being successively or alternately operable, with the transition from one phase to the other occurring smoothly and automatically.

Another object of the invention is more particularly directed to a pressure control device or system which is adapted for inclusion in a loop circuit for a pressurized aviation suit, the system to respond automatically, sensitively and accurately to a slight signal or deviation from the desired pressure within the loop circuit to furnish the unusually disparate flow requirements involved; that is, the relatively small quantity of gas as required for metabolic make-up during level flight, as well as the comparatively large quantities of gas to, and the relief of gas from, the loop circuit, as required during rapid descents and ascents, respectively.

A further object of the invention is to provide a pressure control system which utilizes the relatively high pressure of a gas supplied to the system as the control fluid to pneumatically amplify small pressure deviations from the desired pressure within the loop circuit to signal the actuation of comparatively large forces, thereby affording improved regulation characteristics, together with satisfactory immunity to the forces of acceleration, or deceleration, upon the parts of the control system.

Still another object of the invention resides in the provision of a primary control element, rather than a secondary pilot operated valve, to supply the relatively small rate of gas flow required for human metabolic make-up, though the supply valve is closed.

Still a further object of the invention is to provide a system for controlling the pressure in a loop circuit during the differential and absolute pressure phases, which is operable without necessitating continuous external bleeding and the waste of gas to the atmosphere, while affording a system which is accurate, sensitive and free of temperature influences.

Another object of the invention is to contain a pressure control system of the type under consideration within a small and compact device, thereby desirably affording economy of size and weight.

An object of the invention is to provide a fluid supply and pressure control system which embodies a combination of the advantages as outlined above.

While the fluid supply and pressure control means of the invention is particularly suitable for use in a respiration circuit for circulating breathing gases or oxygen to a pressurized flying suit, it will be understood that the device of the invention may be used wherever accurate control of fluid flow and pressure are required.

These, and other objects and advantages of the invention will be more clearly understood from the following detailed description, taken in conjunction with the drawings of a preferred embodiment of the invention, in which.

Figure 1:
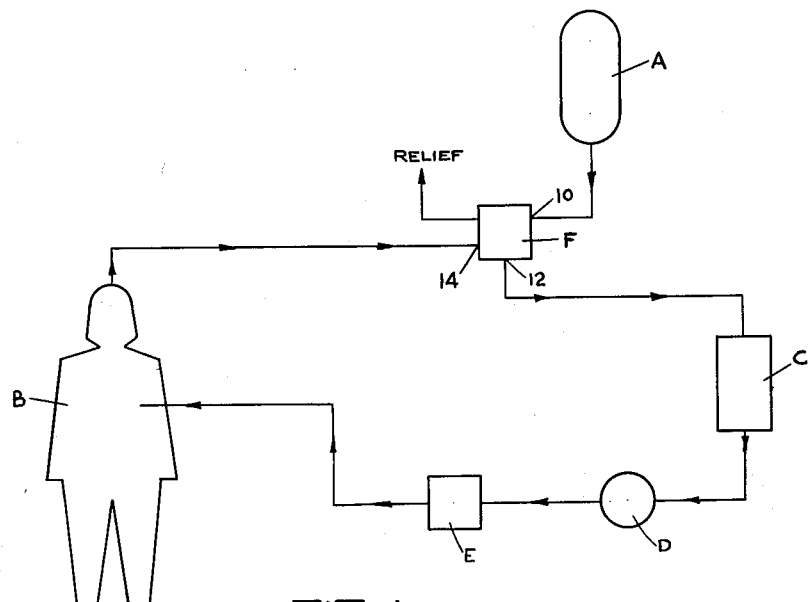
FIG. 1 is a diagrammatic view of a respiration or loop circuit having a device providing the pressure control system of the invention connected in the circuit.

As shown in FIG. 1, a suitable source A of breathing gas or oxygen is in communication with an aviation suit B through a loop circuit, which includes a carbon dioxide absorber canister C, gas circulating means, such as a pump D, and a heat exchanger E. A pressure control device F in accordance with the invention is connected in the loop circuit in communication with the gas source on inlet side 10 of the device, with the canister on its outlet side 12, and with the outlet side of the suit at 14. The gas source may be a high pressure storage cylinder provided with a regulator to deliver to the device F approximately 600 c.f.h. of oxygen at a nominal pressure of between 50 and 150 p.s.i.g. A pressure of 75 p.s.i.g. is preferred. If desired, the inlet side 10 of the control device may be connected to the delivery valve of a liquid oxygen converter. The loop circuit flows directly through the pressure control device F.

Figure 2:
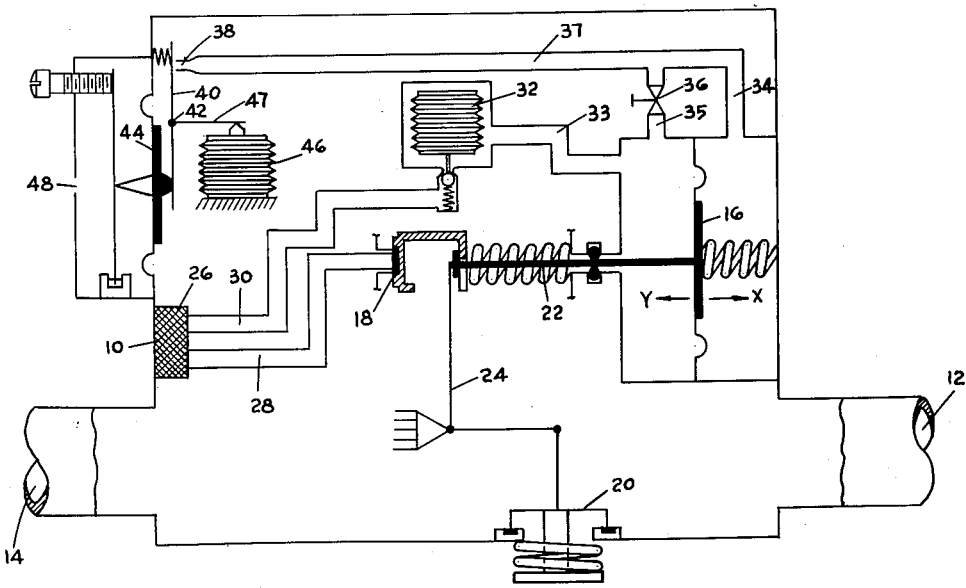
FIG. 2 is a schematic diagram of the pressure control system provided by the device connected in the loop circuit of FIG. 1.

In accordance with the invention, and as schematically illustrated in FIG. 2, the fluid flow and pressure control system provided by the device F comprises pressure responsive valve actuating means 16 to open and close both a supply or delivery valve 18 and a relief valve 20. If desired, the relief valve may be located elsewhere, and otherwise actuated. It is preferred, however, to individually actuate both valves by the single actuating means 16. The valve actuating means is preferably in the form of a resiliently mounted diaphragm. If desired, an O-ring type of piston may be used. A shaft 22 connects the valve actuating diaphragm to the supply valve, and through an intermediate link 24, to the relief valve. If the gas delivered to the device F requires the removal of foreign matter, a filter 26 is provided at the entrance to a line or passage 28 leading to the supply valve. The supply valve, when open, discharges gas directly into the loop circuit. A passage 30, also in communication with the inlet 10, is in communication with the left side of the valve actuating diaphragm. If the pressure of the gas entering the system provided by the device F is higher than the pressure desired at the diaphragm, a pressure regulator 32 is provided in the line 30, a passage 33 leading from the chamber for the regulator to the diaphragm. As will be subsequently explained, it is desired to deliver gas at a predetermined fixed pressure to the valve actuating diaphragm.

In the preferred embodiment of the invention, a control circuit is provided for the valve actuating diaphragm 16 to respectively open and close both the supply and relief valves 18 and 20 to meet the flow requirements of the system or the loop circuit in response to variations in pressure of the ambient atmosphere below a critical altitude of 27,500 feet; and, to meet the flow requirements independently of ambient pressure, when the pressure of the ambient atmosphere is not available to signal the actuation of the valves. The control circuit for the valve actuating diaphragm serves to maintain a desired predetermined differential pressure in the loop circuit with respect to the pressure of the ambient atmosphere and a minimum pressure at all times, despite the ineffectiveness of ambient pressure above the critical altitude of 27,500 feet to signal the addition and relief of gas to and from the loop circuit. Also, as will be subsequently explained, the control circuit is arranged to discharge a quantity of gas directly into the loop circuit which is adequate for average respiration needs or metabolic make-up so that periodic actuation of a secondary supply valve may be eliminated if the loop circuit does not otherwise require the supply of gas. If desired, the control circuit may be related to a supply valve only, instead of both to supply and relief valves.

The control circuit comprises a passage 34 in communication with the right side of the valve actuating diaphragm 16 and a passage 35 in communication with the left side of the diaphragm. An adjustable restricted orifice 36 is provided in the passage 35. The size of the orifice is adjusted and set to provide a differential pressure across the valve actuating diaphragm sufficient to cause movement of the supply and relief valves and to compensate for their spring loadings. The passages 34 and 35 communicate with a line 37 which terminates in a nozzle 38. Cooperating control means 40 is provided for regulating the flow from the nozzle and thereby control the position of the valve actuating diaphragm. Such means is preferably in the form of a flapper pivotally mounted at 42 for cooperation of an end thereof with the nozzle opening. The flapper is arranged so that its positional relationship with respect to the nozzle opening is selectively and alternately responsive to either a pressure sensing element 44 or a pressure sensing element 46. The flapper is provided with an extension 47 for engagement by the pressure sensing element 46.

The pressure sensing element 44, which is preferably in the form of a resiliently mounted diaphragm, may be termed a differential or ambient pressure sensing element; its inner or right side is in communication with the loop circuit and its left side is in communication with the ambient atmosphere through a communicating opening 48. The pressure sensing element 46, which is preferably in the form of an aneroid bellows, may be termed an absolute pressure sensing element; for it is only subject to pressure variations within the closed loop circuit. Its response is independent of pressure variations of the ambient atmosphere. The aneroid bellows, which is initially evacuated, will assume a length proportional to the surrounding loop pressure. The differential and absolute pressure sensing elements 44 and 46, individually and successively, actuate the flapper 40 to control the flow of gas from the control nozzle 38.

The valve actuating diaphragm 16 and the supply and relief valves 18 and 20 are preferably adjusted so that both valves are closed in the mid-position range of the diaphragm. When the diaphragm is moved to the right, or in the direction of the arrow X, the supply valve 18 is opened. When the diaphragm is moved to the left of the mid-position range, in the direction of arrow Y, the relief valve 20 is opened. When the discharge from the control nozzle 38 is maximum, the supply valve is fully open, and when there is no discharge from the nozzle opening, the relief valve is open. If the control circuit is used to only open and close a supply valve, the valve is closed when the flow from the control nozzle is zero, and is fully open when the flow from the nozzle is maximum.

In the preferred form of the invention, the nozzle and flapper are related, with respect to the setting of the pressure sensing elements 44 and 46, the valve actuating diaphragm 16 (and the coacting supply and relief valves), and the restricted orifice 36, so that when the valve actuating diaphragm is in its mid-position range, and both valves are closed, the nozzle will be open and continuously discharging at a substantially uniform rate. When the pressure control system or device is disposed in a loop circuit for a pressurized suit, the continuous discharge from the nozzle into the loop circuit is an amount of gas adequate for average metabolic make-up. In this manner, a suitable quantity of gas for respiratory purposes is supplied to the loop circuit without necessitating opening of the supply valve, and when large flow rates to pressurize the suite are not required. This feature of the invention eliminates the need for a secondary respiratory supply valve. Thus, the control circuit serves both to supply respiratory needs and to control the large rates of flow required to pressurize and depressurize the suit. Such dual function of the control circuit is desirable during level flight and in the absolute pressure phase of operation, whereupon the supply valve would only be opened in the event that the constant supply from the control nozzle is somewhat less than the needs of the particular individual, or in the event a leak somehow developed in the suit or the loop circuit.

In using the described fluid flow and pressure control system in a loop circuit for a pressurized flying suit, it is preferred to deliver gas to the valve actuating diaphragm 16, at a fixed pressure of 40 p.s.i.a. A pressure value of 40 p.s.i.a. is selected so that, assuming as much as a 10 p.s.i.a. drop is required to actuate the valves over their full range, the control nozzle 38, then supplied with 30 p.s.i.a., is discharging to a pressure less than the critical pressure of approximately one-half (½) the pressure of the gas which is supplied to the nozzle opening; that is, 5.0 to 15.0 p.s.i.a. The selection of a gas pressure of 40 p.s.i.a. for delivery to the actuating diaphragm is based upon maintaining a minimum pressure in the loop circuit (of which the described pressure control system is a part) of 3 inches of water pressure above ambient pressure down to a minimum of 5 p.s.i.a., with a pressure tolerance of minus zero plus three inches of water. As a result, the actuator response is effectively immunized from the pressure variation of from 5 to 15 p.s.i.a. in the loop circuit.

A further significant reason for selecting a pressure of 40 p.s.i.a. for delivery to the valve actuating diaphragm and the control circuit is that such pressure, when supplying a nozzle opening having a minimum hole diameter of approximately 0.006″, will pass 0.75 c.f.h. of oxygen when the nozzle opening is only partially open. This quantity of oxygen approximates the average human metabolic consumption rate, and as previously indicated, the control circuit may thus discharge a quantity of oxygen adequate for respiration at all times, including periods when the supply and relief valves are closed.

The described pressure control system operates in a loop circuit in the following manner. During periods when the altitude is less than 27,500 feet, the aneroid bellows 46 is collapsed and out of contact with the flapper 40; the flapper is under the control of the ambient pressure sensing diaphragm 44. When the loop pressure tends to go below the desired differential with respect to the pressure of the ambient atmosphere, the ambient pressure sensing diaphragm 44 will move to the right, causing the flapper 40 to rotate in the direction which uncovers the opening of the nozzle 38, thereby increasing the flow of oxygen from the nozzle and into the loop circuit. Such increase in flow causes an increase in the pressure differential across the orifice 36, and across the valve actuating diaphragm 16. The pressure on the right side of the valve actuating diaphragm being reduced with respect to the predetermined fixed pressure on its left side, the diaphragm will move to the right, in the direction of the arrow X, to open the supply valve 18.

When the pressure in the loop circuit tends to go above the desired differential with respect to the pressure of the ambient atmosphere, the reverse operation occurs. The ambient pressure sensing diaphragm 44 moves to the left, actuating or rotating the flapper to reduce the discharge of gas from the nozzle, thereby causing a decrease in the pressure differential across the valve actuating diaphragm 16. The actuating diaphragm, therefore, under the influence of its resilient mounting, is urged to the left, in the direction of the arrow Y, causing the supply valve to be closed when in mid-position range, and opening the relief valve 20 to relieve the loop circuit as the diaphragm continues to move left of mid-position range.

During periods of decreasing ambient pressure, the differential pressure sensing diaphragm moves to the left, actuating the flapper in the direction which causes a decrease in flow from the nozzle. Consequently, the relief valve is opened to vent gas from the loop circuit. As the pressure within the loop circuit is thus decreased, the aneroid sensing bellows 46 will expand. The bellows has been initially adjusted or pre-set to begin expanding from its collapsed condition when the loop pressure falls to a predetermined value. At such preset pressure value, the aneroid bellows engages the extension 47 of the flapper to begin the actuation thereof in the opposite direction, causing the flow from the nozzle opening to be increased and the relief valve to be closed, thereby preventing further decrease in pressure in the loop circuit. When this occurs the ambient pressure sensing diaphragm, in response to the continuing decrease of the ambient pressure, has moved outwardly or to the left to an extent where it no longer will operate upon the flapper. The aneroid bellows now actuating the flapper has taken over the operation of the control circuit and of the valve actuating diaphragm, and will maintain the desired loop pressure independently of the pressure of the ambient atmosphere. Under the control of the aneroid device, the system continues to possess full capability in terms of supply and relief flow rates for the closed loop circuit.

The switch, transition or change-over from absolute pressure to differential pressure sensing control takes place smoothly in a reverse fashion during descents when the pressure of the ambient atmosphere begins to exceed 5 p.s.i.a.

A significant feature of the described pressure control system resides in the absence or the elimination of any external bleeding or leakage to the atmosphere throughout the full range of operation of the system. The bleeding which does occur is internal and into the closed loop circuit for the purpose of supplying average respiratory needs or incident to the control of the valve actuating diaphragm. Such internal leakage does not cause the device to be affected by variations in temperature of the ambient atmosphere.

In greater detail, FIGS. 3 to 8 illustrate a preferred embodiment of the structural elements, and their relationship, comprising the fluid flow and pressure control system of the invention, and the manner in which the elements may be contained within a small and compact body or block 50. The body is drilled, hobbed and otherwise machined to provide the passages for the gas to the various elements, and the cavities to contain and to support the elements in desired relation. The entire assembly may weigh as little as 16 ounces, when made essentially of aluminum, and be confined in a space of approximately 13 cubic inches.

Figure 4:
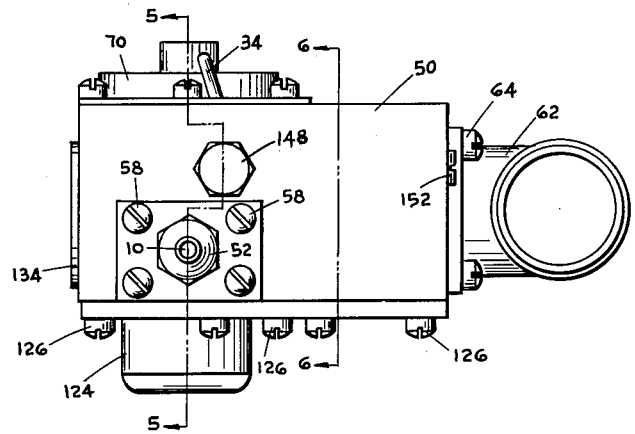
FIG. 4 is a top view of the device shown in FIG. 3.
Figure 3:
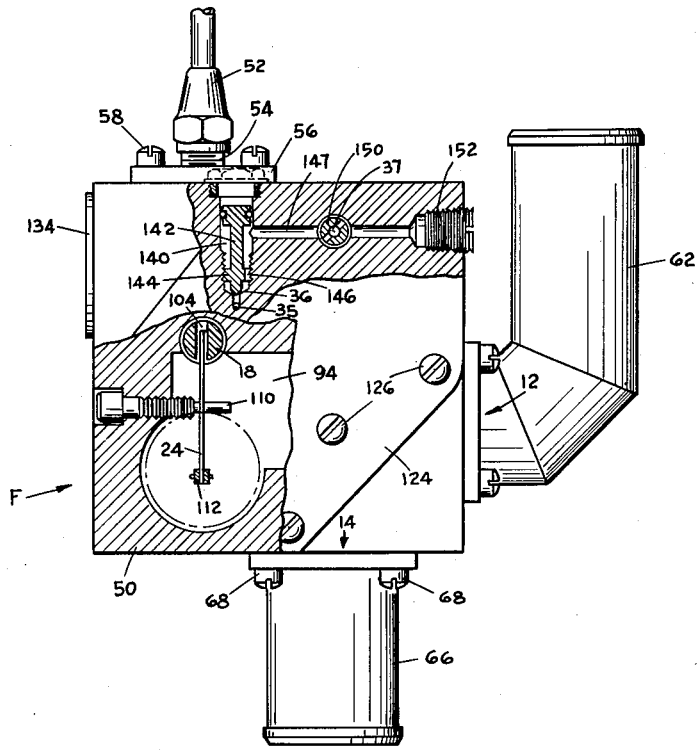
FIG. 3 is a side elevation, partly broken away and in section, of the pressure control device.
Figure 5:
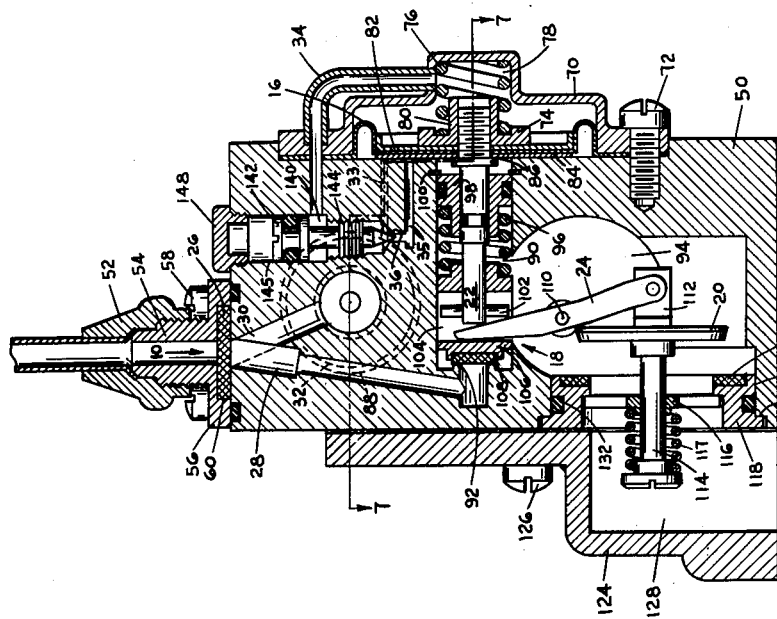
FIG. 5 is a vertical cross-sectional view taken approximately in the planes of line 5—5 of FIG. 4.

As shown in FIGS. 3, 4 and 5, a fitting 52 is screw-threaded upon an inlet member 54, the inlet member having a flange portion 56 which is secured to the body by screws 58. The fitting and inlet member are provided with communicating openings to allow the passage of gas from the source A to the inlet 10 of the body and to the passages 28 and 30 formed in the body and leading to the supply valve 18 and the valve actuating diaphragm 16, respectively. As shown in FIG. 5, the filter 26 is positioned in a recess 60 formed in the bottom of the inlet member 54, at the juncture of the member and the passages 28 and 30. As shown in FIG. 3, a flanged tubular fitting 62 is secured to a side of the body by screws 64 to provide the outlet connection 12 to the carbon dioxide cannister C, and a flanged tubular fitting 66 is secured to another side of the body by screws 68 to provide means for connection to the outlet side of the suit B.

Figure 7:
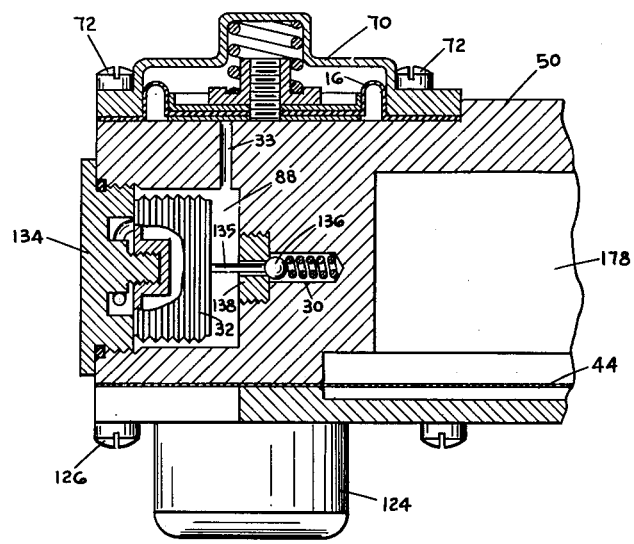
FIG. 7 is a view taken approximately in the planes of line 7—7 of FIG. 5, this view being taken rearwardly of the plane viewed in FIG. 5.

As shown in FIGS. 5 and 7, the valve actuating diaphragm 16, such as a flanged, dished type as made by Bellofram, is secured in position against a side of the body 50 by a flanged cap 70, screws 72 extending through the flanged portion of the cap and into the body to retain the diaphragm therebetween. A retaining nut 74 is positioned on the central portion of the diaphragm and resiliently urged against the diaphragm by a coiled spring 76. One end of the spring is seated against the cap within a depression 78 formed therein, and the other end bears against the nut. The nut is provided with an annular extension 80 which is internally threaded to receive the valve shaft 22, which connects the diaphragm to the supply valve 18 and to the relief valve 20. The shaft is in the form of a threaded plunger, its threaded portion being matingly received by the internal threaded portion of the nut. A shallow, dished plate 82 having a diameter substantially equal to the diaphragm's central flat portion is located intermediate the diaphragm and the nut, and a second plate 84 of similar diameter is positioned between the diaphragm and the body 50. Both plates are centrally apertured to allow the shaft to extend therethrough and through the diaphragm. The valve shaft is provided with a collar 86 having a larger diameter than the opening of the plate 84 against which it bears. The shaft has its head slotted to receive a screw driver so that the position of the diaphragm, assembled as described, may be adjusted and set, after which the cap 70 is secured in place. The gas delivered to the inlet 10 passes through the passage 30 to a chamber 88, which houses the absolute pressure regulator 32, and from the chamber the gas passes through the passage 33 to the left side of the diaphragm.

As shown in FIG. 5, the supply valve 18 is located in a cavity 90 formed in the body, the valve shaft 22 extending into such cavity. The passage 28 is in communication with the cavity, and the terminal portion of the passage is formed to provide a valve seat 92 for engagement by the supply valve. The cavity, and therefore the supply passage 28, is in communication with a bore 94. The bore becomes part of the loop circuit when the device is disposed in such circuit, for it is in communication with the device's outlet 12 and inlet 14, or the fittings 62 and 66, respectively. In the mid-position range of the valve actuating diaphragm 16, the supply valve engages the seat 92 and is closed. The supply valve is urged against the seat by a spring 96 which surrounds the shaft, the spring having one end thereof bearing against a spring retainer 98, which surrounds the shaft, the other end of the spring bearing against the rear portion of the valve. A snap ring 100 limits the movement of the spring retainer. An O-ring is provided between the retainer and the wall of the cavity to provide a seal against the passage of gas to the diaphragm assembly at this area; also, an O-ring is provided between the shaft and the retainer. The valve shaft is provided with a roll-pin 102 at the end thereof to prevent separation of the valve and shaft. The shaft end engages the relief valve link 24.

As shown in FIGS. 3 and 5, the supply valve 18 is yoke-shaped or bifurcated and has a slot 104 which receives one end of the relief valve link 24. The front portion 106 of the valve is provided with a recess within which is set a rubber plug 108 for engagement with the valve seat 92. The relief valve link is pivoted intermediate its ends upon a pin 110. As shown in FIG. 3, the pivot pin is screw-threaded through the block 50 and extends into the bore 94. The opposite end of the link is pivotally connected to a rearward extension 112 of the relief valve 20.

As shown in FIG. 5, the relief valve is mounted on the end of a screw 114 which extends through the central opening of a spring retainer 116. A coiled compression spring 117 is disposed about the screw and bears against the retainer and the head of the screw. The retainer, which is in the form of a central hub with radially extending arms (not shown) is received in and supported at the ends of the arms against an internal shoulder provided by a valve seat 118. The valve seat is positioned in an opening 120 formed in the body 50. The valve seat is circumferentially flanged and is held against a shoulder 122 formed in the body by a plate 124 secured to the body by screws 126. As will subsequently appear, the plate 124 also serves to secure the ambient pressure sensing element 44 to the body 50. The plate engages the periphery of the valve seat, and is of a contour to allow the head of the screw to extend beyond the side wall of the body and into a recess 128 provided between the plate and the body. The valve seat is provided with a gasket 130 for engagement by the valve 22. An O-ring 132 is located between the periphery of the valve seat and the adjoining wall of the opening 120 to furnish a seal.

As shown in FIG. 7, the pressure regulator 32 is located in the chamber 88 formed in the body 50. The regulator is of the spring bellows type, and is adjustable by a screw-threaded regulator cap 134. A stem 135 extends from the bellows and engages a resiliently mounted ball check valve 136 so that the position of the valve may be adjusted with respect to the seat 138. In this manner the pressure of the gas delivered at the inlet 10 to the body, and to the check valve in communication with the passage 30, may be regulated to the desired value for delivery to the left side of the diaphragm 16, the passage 33 leading from the regulator chamber to the diaphragm.

As shown in FIG. 5, the line 34 in communication with the right side of the valve actuating diaphragm 16 is in the form of a short conduit extending through the cap 70. This line leads to a chamber 140 surrounding the stem of a needle valve 142. The needle valve is externally threaded at 144 and matingly received in the internally threaded portion of the cavity 145 formed in the block for such valve. The needle valve cooperates with seat or orifice 36 located at the end of the passage 35, which is in communication with the left side of the diaphragm 16. A slot 146 (FIG. 3) is provided at the screw-threaded portion 144 of the valve to allow the gas delivered to the left side of the valve diaphragm, and to the orifice 36, to pass through the passage 37 and to the control nozzle 38. A passage 147 leads from the chamber 140 to the passage 37, the latter passage running through the nozzle, and its holder. As shown in FIG. 3, a threaded plug 152 is located at the end of the passage 147 to permit a checking instrument to be placed on the device, and in communication with the needle valve and the control nozzle, when the plug is removed. The position of the needle valve with respect to the orifice or seat 36 is adjusted by removing the cap 148 and turning the valve stem with a screw driver received in a slot in the head of the valve.

Figure 6:
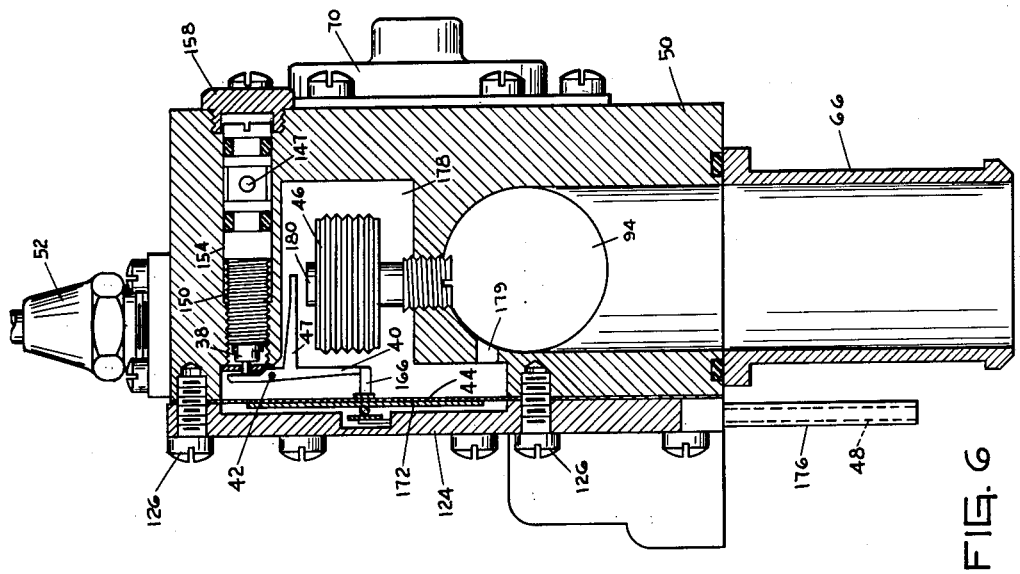
FIG. 6 is a vertical cross-sectional view taken approximately in the plane of line 6—6 of FIG. 4.
Figure 8:
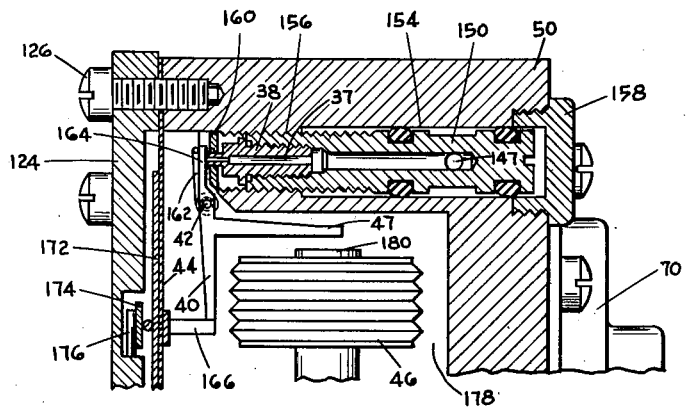
FIG. 8 is an enlarged view, partly in section, showing the relationship of the ambient pressure sensing means and the absolute pressure sensing means with respect to a common responsive means related to a control nozzle.

As shown in FIGS. 6 and 8, the control nozzle 38, which is externally screw-threaded, is received within an internally screw-threaded nozzle holder 150. The nozzle and nozzle holder are disposed in a bore 154 formed in the body 50, a bore 156 of smaller diameter being internally screw-threaded to receive the externally screw-threaded nozzle holder. O-rings are provided between the holder and the wall of the cavity. The position of the nozzle is adjustable in the bore by rotating the nozzle holder. For this purpose the nozzle holder is provided with a slot in the head thereof for turning the element with a screw driver. A screw threaded cover 158 received in the body closes off the bore after the adjustment has been made. The nozzle 38 terminates in a nozzle opening for cooperation with the flapper 40.

As best shown in FIG. 8, the flapper is pivotally mounted at 42 on a bracket 160 having an opening therein allowing the end of the nozzle to extend therethrough. The flapper is provided with laterally extending pivot arms (not shown), a spring 162 being coiled about each arm and connected to the supporting bracket to urge the end 164 of the flapper toward the opening of the nozzle. The opposite end 166 of the flapper is formed for engagement with the ambient pressure sensing diaphragm 44. The diaphragm is preferably made of thin sheet rubber and is secured about its periphery to the body 50 by the aforementioned plate member 124. A metal diaphragm plate 172 is in engagement with the outer side of the diaphragm and in turn the exposed face of the plate is formed for engagement with a leaf spring 174, which provides resilient backing for the diaphragm and plate assembly. The plate side of the diaphragm is in communication with the ambient atmosphere through an opening 48, which extends through a diaphragm spring adjustment shaft 176 as shown in FIG. 6. The adjustment shaft is provided with an eccentric (not shown) to permit adjustment of the spring loading on the diaphragm and plate assembly.

The flapper 40 is provided with an extension arm 47 which extends into a cavity 178 within which the aneroid device 46 is mounted. The aneroid device may be of the usual spring bellows type. The aneroid is in communication with the recess within which the diaphragm and flapper are mounted, an opening 179 leading to the bore 94, which communicates with the loop circuit outlet 12 and inlet 14. The aneroid device is screw-threaded at its mounting end and received within a matingly screw-threaded portion formed in the body. The position of the aneroid bellows is adjusted in its support so that its opposite or working end 180 will be located in the desired position with respect to the end of the flapper extension 47.

It is believed that the advantages of the invention will be apparent from the foregoing detailed description. The described pressure control device provides a desired predetermined pressure during the ambient pressure and absolute pressure phases of operation, with the transition or switch from one phase to the other taking place automatically and smoothly. A slight signal or deviation from the desired pressure causes the device to automatically, sensitively and accurately respond to unusually large flow requirements, as well as to the relatively small flow requirements for metabolic make-up. In fact, the pressure control device is sufficiently sensitive to furnish the unusually small deviation of the individual's respiratory needs from the uniform discharge by the device for average needs, thereby obviating the need to actuate the supply valve when the supply valve may otherwise be closed. Advantage is taken of the relatively high pressure of the gas furnished to the pressure control device to amplify small pressure deviations from the desired pressure to signal the actuation of comparatively large forces. The foregoing advantages are accomplished in a small and compact unit, without any external bleeding and waste of gas to the atmosphere, and free of undesirable temperature influences.

While a preferred form of the invention has been illustrated and described, it will be apparent that various changes and modifications may be made without departing from the spirit and scope of the invention as sought to be defined by the following claims:

I claim:

1. A fluid flow and pressure control device comprising a body having an inlet, an outlet, a supply valve in communication with the inlet for discharging fluid, when open, to the outlet, pressure responsive valve actuating means, having a side thereof in communication with the inlet, connected to the supply valve, the opening and closing of the valve depending upon the position of the valve actuating means, and a control circuit for maintaining a desired pressure with respect to the varying pressure of the ambient atmosphere, and alternately and automatically, for maintaining the desired pressure independently of varying ambient pressure, said control circuit comprising a nozzle in communication with opposite sides of said valve actuating means, said nozzle discharging fluid to said outlet, means mounted for cooperation with said nozzle to control the amount of discharge from the nozzle and thereby the position of said valve actuating means, a differential pressure sensing element exposed to and responsive to the pressure of the ambient atmosphere for actuating the nozzle control means, said pressure sensing element being rendered inoperable when the desired minimum pressure exceeds the pressure of the ambient atmosphere, and an absolute pressure sensing element responsive to pressure variations within the device for actuating said nozzle control means, said absolute pressure sensing element being operable independently of the pressure of the ambient atmosphere and when the desired minimum pressure within the device exceeds the pressure of the ambient atmosphere.

2. A fluid flow and pressure control device comprising a body having an inlet, an outlet, a supply valve in communication with the inlet for discharging fluid, when open, to the outlet, pressure responsive valve actuating means, having a side thereof in communication with the inlet, connected to the supply valve, the opening and closing of the valve depending upon the position of the valve actuating means, and a control circuit for maintaining a desired pressure with respect to the varying pressure of the ambient atmosphere, and alternately and automatically, for maintaining the desired pressure independently of varying ambient pressure, said control circuit comprising means to provide a substantially fixed differential pressure across said valve actuating means, a nozzle in communication with opposite sides of said valve actuating means, said nozzle discharging fluid to said outlet, means mounted for cooperation with said nozzle to control the amount of discharge from the nozzle and thereby the position of said valve actuating means, a differential pressure sensing element exposed to and responsive to the pressure of the ambient atmosphere for actuating the nozzle control means, said pressure sensing element being rendered inoperable when the desired minimum pressure exceeds the pressure of the ambient atmosphere, and an absolute pressure sensing element responsive to pressure variations within the device for actuating said nozzle control means, said absolute pressure sensing element being operable independently of the pressure of the ambient atmosphere and when the desired minimum pressure exceeds the pressure of the ambient atmosphere.

3. A fluid flow and pressure control device comprising a body having an inlet, an outlet, a supply valve in communication with the inlet for discharging fluid, when open, to the outlet, pressure responsive valve actuating means, having a side thereof in communication with the inlet, connected to the supply valve, a pressure regulator in communication with said side of the valve actuating means to provide fluid having a predetermined pressure to such side, the opening and closing of the valve depending upon the position of the valve actuating means, and a control circuit for maintaining a desired pressure with respect to the varying pressure of the ambient atmosphere, and alternately and automatically, for maintaining the desired pressure independently of varying ambient pressure when the desired minimum pressure exceeds the pressure of the ambient atmosphere, said control circuit comprising an adjustable orifice in communication with the aforesaid side of the valve actuating means, a nozzle in communication with said orifice and the opposite side of said valve actuating means, said nozzle discharging fluid to said outlet, means mounted for cooperation with said nozzle to control the amount of discharge from the nozzle and thereby the position of said valve actuating means, a differential pressure sensing element exposed to and responsive to the pressure of the ambient atmosphere for actuating the nozzle control means, said pressure sensing element being rendered inoperable when the desired minimum pressure exceeds the pressure of the ambient atmosphere, and an absolute pressure sensing element responsive to pressure variations within the device for actuating said nozzle control means, said absolute pressure sensing element being operable independently of the pressure of the ambient atmosphere when the desired minimum pressure exceeds the pressure of the ambient atmosphere.

4. A fluid flow and pressure control device comprising a body having an inlet, an outlet, a supply valve in communication with the inlet for discharging fluid, when open, to the outlet, pressure responsive valve actuating means, having a side thereof in communication with the inlet, connected to the supply valve, a relief valve, said relief valve also being connected to the valve actuating means, the opening and closing of the valve depending upon the position of the valve actuating means, and a control circuit for maintaining a desired pressure with respect to the varying pressure of the ambient atmosphere, and alternately and automatically, for maintaining the desired pressure independently of varying ambient pressure, said control circuit comprising a nozzle in communication with opposite sides of said valve actuating means, said nozzle discharging fluid to said outlet, means mounted for cooperation with said nozzle to control the amount of discharge from the nozzle and thereby the position of said valve actuating means, a differential pressure sensing element exposed to and responsive to the pressure of the ambient atmosphere for actuating the nozzle control means, said pressure sensing element being rendered inoperable when the desired minimum pressure exceeds the pressure of the ambient atmosphere, and an absolute pressure sensing element responsive to pressure variations within the device for actuating said nozzle control means, said absolute pressure sensing element being operable independently of the pressure of the ambient atmosphere and when the desired minimum pressure within the device exceeds the pressure of the ambient atmosphere.

5. A fluid flow and pressure control device comprising a body having an inlet, an outlet, a supply valve in communication with the inlet for discharging fluid, when open, to the outlet, pressure responsive valve actuating means, having a side thereof in communication with the inlet, connected to the supply valve, a relief valve, said relief valve also being connected to the valve actuating means, the opening and closing of the valves depending upon the position of the valve actuating means, and a control circuit for automatically maintaining a desired pressure with respect to the varying pressure of the ambient atmosphere, and alternately and automatically, for maintaining the desired pressure independently of varying ambient pressure, said control circuit comprising means to provide a substantially fixed differential pressure across said valve actuating means, a nozzle in communication with opposite sides of said valve actuating means, said nozzle discharging fluid to said outlet, means mounted for cooperation with said nozzle to control the amount of discharge from the nozzle and thereby the position of said valve actuating means, a differential pressure sensing element exposed to and responsive to the pressure of the ambient atmosphere for actuating the nozzle control means, said pressure sensing element being rendered inoperable when the desired minimum pressure exceeds the pressure of the ambient atmosphere, and an absolute pressure sensing element responsive to pressure variations within the device for actuating said nozzle control means, said absolute pressure sensing element being operable independently of the pressure of the ambient atmosphere and when the desired minimum pressure exceeds the pressure of the ambient atmosphere.

6. A fluid flow and pressure control device comprising a body having an inlet, an outlet, a supply valve in communication with the inlet for discharging fluid, when open, to the outlet, pressure responsive valve actuating means, having a side thereof in communication with the inlet, connected to the supply valve, a relief valve, said relief valve also being connected to the valve actuating means, a pressure regulator in communication with said side of the valve actuating means to provide fluid having a predetermined pressure to such side, the opening and closing of the valves depending upon the position of the valve actuating means, and a control circuit for maintaining a desired pressure with respect to the varying pressure of the ambient atmosphere, and alternately automatically, for maintaining the desired pressure independently of vary ambient pressure when the desired minimum pressure exceeds the pressure of the ambient atmosphere, said control circuit comprising an adjustable orifice in communication with the aforesaid side of the valve actuating means, a nozzle in communication with said orifice and the opposite side of said valve actuating means, said nozzle discharging fluid to said outlet, means mounted for cooperation with said nozzle to control the amount of discharge from the nozzle and thereby the position of said valve actuating means, a differential pressure sensing element exposed to and responsive to the pressure of the ambient atmosphere for actuating the nozzle control means, said pressure sensing element being rendered inoperable when the desired minimum pressure exceeds the pressure of the ambient atmosphere, and an absolute pressure sensing element responsive to pressure variations within the device for actuating said nozzle control means, said absolute pressure sensing element being operable independently of the pressure of the ambient atmosphere when the desired minimum pressure exceeds the pressure of the ambient atmosphere.

7. In a gas flow and pressure control device adapted for disposition in a loop circuit, said device comprising a body having a gas source inlet, an outlet and an inlet for a loop circuit in communication with each other, a supply valve in communication with the gas source inlet for discharging gas, when open, to said outlet, and pressure responsive valve actuating means connected to the supply valve, the opening and closing of the valve depending upon the position of the valve actuating means, the improvement comprising a nozzle in communication with the valve actuating means for discharging gas to said outlet, and means mounted for cooperation with said nozzle to control the amount of discharge from the nozzle and thereby the opening and closing of the supply valve, the nozzle and nozzle control means being related to allow the discharge of a substantially uniform rate of gas, though the valve actuating means is in a position in which the supply valve is closed.

8. A gas flow and pressure control device adapted for disposition in a loop circuit, said device comprising a body having a gas source inlet, an outlet and an inlet for a loop circuit in communication with each other, a supply valve in communication with the gas source inlet for discharging gas, when open, to said outlet, pressure responsive valve actuating means connected to the supply valve, the opening and closing of the valve depending upon the position of the valve actuating means, a nozzle in communication with the valve actuating means for discharging gas to said outlet, means mounted for cooperation with said nozzle to control the amount of discharge from the nozzle and thereby the opening and closing of the supply valve, and pressure responsive means for alternately and automatically actuating the nozzle control means to maintain a desired pressure with respect to the pressure of the ambient atmosphere and to maintain the desired pressure independently of varying ambient pressure.

9. A gas flow and pressure control device adapted for disposition in a loop circuit, said device comprising a body having a gas source inlet, an outlet and an inlet for a loop circuit in communication with each other, a supply valve in communication with the gas source inlet for discharging gas, when open, to said outlet, pressure responsive valve actuating means, having a side thereof in communication with the gas source inlet, connected to the supply valve, the opening and closing of the valve depending upon the position of the valve actuating means, and a control circuit for maintaining a desired pressure at said outlet with respect to the varying pressure of the ambient atmosphere, and alternately and automatically, for maintaining the pressure independently of varying ambient pressure, said control circuit comprising a nozzle in communication with opposite sides of said valve actuating means, said nozzle discharging gas to said outlet, and means mounted for cooperation with said nozzle to control the amount of discharge from the nozzle and thereby the position of said valve actuating means, the nozzle and nozzle control means being related to allow the discharge of a substantially uniform rate of gas, though the valve actuating means is in a position in which the supply valve is closed.

10. A gas flow and pressure control device adapted for disposition in a loop circuit for a pressurized flying suit, said device comprising a body having a gas source inlet, an outlet and an inlet for a loop circuit in communication with each other, a supply valve in communication with the gas source inlet for discharging gas, when open, to said outlet, pressure responsive valve actuating means, having a side thereof in communication with the gas source inlet, connected to the supply valve, a pressure regulator in communuication with said side of the valve actuating means to provide gas having a predetermined pressure to such side, the opening and closing of the valve depending upon the position of the valve actuating means, and a control circuit for maintaining a desired pressure at said outlet with respect to the varying pressure of the ambient atmosphere, and alternately and automatically, for maintaining the pressure independently of varying ambient pressure when the desired minimum pressure at said outlet exceeds the pressure of the ambient atmosphere, said control circuit comprising an adjustable orifice in communication with the aforesaid side of the valve actuating means, a nozzle in communication with said orifice and the opposite side of said valve actuating means discharging gas to said outlet, and means mounted for cooperation with said nozzle to control the amount of discharge from the nozzle and thereby the position of said valve actuating means, the nozzle and the nozzle control means being related to allow the discharge of gas in an amount sufficient for average respiratory needs, though the valve actuating means is in a position in which the supply valve is closed.

11. A gas flow and pressure control device adapted for disposition in a loop circuit, said device comprising a body having a gas source inlet, an outlet and an inlet for a loop circuit in communication with each other, a supply valve in communication with the gas source inlet for discharging gas, when open, to said outlet, pressure responsive valve actuating means, having a side thereof in communication with the gas source inlet, connected to the supply valve, a relief valve, said relief valve also being connected to the valve actuating means, the opening and closing of the valves depending upon the position of the valve actuating means, and a control circuit for maintaining a desired pressure at said outlet with respect to the varying pressure of the ambient atmosphere, and alternately and automatically, for maintaining the pressure independently of varying ambient pressure, said control circuit including a nozzle in communication with opposite sides of said valve actuating means, said nozzle discharging gas to said outlet, and means mounted for cooperation with said nozzle to control the amount of discharge from the nozzle and thereby the position of said valve actuating means, the nozzle and the nozzle control means being related to allow the discharge of a substantially uniform rate of gas, though the valve actuating means is in a position in which the supply and relief valves are closed.

12. A gas flow and pressure control device adapted for disposition in a loop circuit for a pressurized flying suit, said device comprising a body having a gas source inlet, an outlet and an inlet for a loop circuit in communication with each other, a supply valve in communication with the gas source inlet for discharging gas, when open, to said outlet, pressure responsive valve actuating means, having a side thereof in communication with the gas source inlet, connected to the supply valve, a relief valve, said relief valve also being connected to the valve actuating means, a pressure regulator in communication with said side of the valve actuating means to provide gas having a predetermined pressure to such side, the opening and closing of the valves depending upon the position of the valve actuating means, and a control circuit for maintaining a desired pressure at said outlet with respect to the varying pressure of the ambient atmosphere, and alternately and automatically, for maintaining the pressure independently of varying ambient pressure when the desired minimum pressure at said outlet exceeds the pressure of the ambient atmosphere, said control circuit comprising an adjustable orifice in communication with the aforesaid side of the valve actuating means, a nozzle in communication with said orifice and the opposite side of said valve actuating means discharging gas to said outlet, and means mounted for cooperation with said nozzle to control the amount of discharge from the nozzle and thereby the position of said valve actuating means, the nozzle and the nozzle control means being related to allow the discharge of gas in an amount sufficient for average respiratory needs, though the valve actuating diaphragm is in a position in which the supply and relief valves are closed.

13. A gas flow and pressure control device comprising a body having an inlet, an outlet, a supply valve in communication with the inlet for discharging gas, when open, to the outlet, pressure responsive valve actuating means, having a side thereof in communication with the inlet, connected to the supply valve, the opening and closing of the valve depending upon the position of the valve actuating means, and a control circuit for maintaining a desired pressure with respect to the varying pressure of the ambient atmosphere, and alternately and automatically, for maintaining the desired pressure independently of varying ambient pressure, said control circuit comprising a nozzle in communication with opposite sides of said valve actuating means, said nozzle discharging gas to said outlet, means mounted for cooperation with said nozzle to control the amount of discharge from the nozzle and thereby the position of said valve actuating means, the nozzle and the nozzle control means being related to allow the discharge of a substantially uniform rate of gas, though the valve actuating means is in a position in which the supply valve is closed, a differential pressure sensing element exposed to and responsive to the pressure of the ambient atmosphere for actuating the nozzle control means, said pressure sensing element being rendered inoperable when the desired minimum pressure exceeds the pressure of the ambient atmosphere, and an absolute pressure sensing element responsive to pressure variations within the device for actuating said nozzle control means, said absolute pressure sensing element being operable independently of the pressure of the ambient atmosphere and when the desired minimum pressure within the device exceeds the pressure of the ambient atmosphere.

14. A gas flow and pressure control device comprising a body having an inlet, an outlet, a supply valve in communication with the inlet for discharging gas, when open, to the outlet, pressure responsive valve actuating means, having a side thereof in communication with the inlet, connected to the supply valve, a pressure regulator in communication with said side of the valve actuating means to provide gas having a predetermined pressure to such side, the opening and closing of the valve depending upon the position of the valve actuating means, and a control circuit for maintaining a desired pressure with respect to the varying pressure of the ambient atmosphere, and alternately and automatically, for maintaining the desired pressure independently of varying ambient pressure when the desired minimum pressure exceeds the pressure of the ambient atmosphere, said control circuit comprising an adjustable orifice in communication with the aforesaid side of the valve actuating means, a nozzle in communication with said orifice and the opposite side of said valve actuating means, said nozzle discharging gas to said outlet, means mounted for cooperation with said nozzle to control the amount of discharge from the nozzle and thereby the position of said valve actuating means, the nozzle and the nozzle control means being related to allow the discharge of a substantially uniform rate of gas, though the valve actuating means is in a position in which the supply valve is closed, a differential pressure sensing element exposed to and responsive to the pressure of the ambient atmosphere for actuating the nozzle control means, said pressure sensing element being rendered inoperable when the desired minimum pressure exceeds the pressure of the ambient atmosphere, and an absolute pressure sensing element responsive to pressure variations within the device for actuating said nozzle control means, said absolute pressure sensing element being operable independently of the pressure of the ambient atmosphere when the desired minimum pressure exceeds the pressure of the ambient atmosphere.

15. A gas flow and pressure control device comprising a body having an inlet, an outlet, a supply valve in communication with the inlet for discharging gas, when open, to the outlet, pressure responsive valve actuating means, having a side thereof in communication with the inlet, connected to the supply valve, a relief valve, said relief valve also being connected to the valve actuating means, the opening and closing of the valves depending upon the position of the valve actuating means, and a control circuit for maintaining a desired pressure with respect to the varying pressure of the ambient atmosphere, and alternately and automatically, for maintaining the desired pressure independently of varying ambient pressure, said control circuit comprising a nozzle in communication with opposite sides of said valve actuating means, said nozzle discharging gas to said outlet, means mounted for cooperation with said nozzle to control the amount of discharge from the nozzle and thereby the position of said valve actuating means, the nozzle and the nozzle control means being related to allow the discharge of a substantially uniform rate of gas, though the supply and relief valves are closed, a differential pressure sensing element exposed to and responsive to the pressure of the ambient atmosphere for actuating the nozzle control means, said pressure sensing element being rendered inoperable when the desired minimum pressure exceeds the pressure of the ambient atmosphere, and an absolute pressure sensing element responsive to pressure variations within the device for actuating said nozzle control means, said absolute pressure sensing element being operable independently of the pressure of the ambient atmosphere and when the desired minimum pressure within the device exceeds the pressure of the ambient atmosphere.

16. A gas flow and pressure control device comprising a body having an inlet, an outlet, a supply valve in communication with the inlet for discharging gas, when open, to the outlet, pressure responsive valve actuating means, having a side thereof in communication with the inlet, connected to the supply valve, a relief valve, said relief valve also being connected to the valve actuating means, a pressure regulator in communication with said side of the valve actuating means to provide gas having a predetermined pressure to such side, the opening and closing of the valves depending upon the position of the valve actuating means, and a control circuit for maintaining a desired pressure with respect to the varying pressure of the ambient atmosphere, and alternately and automatically, for maintaining the desired pressure independently of varying ambient pressure when the desired minimum pressure exceeds the pressure of the ambient atmosphere, said control circuit comprising an adjustable orifice in communication with the aforesaid side of the valve actuating means, a nozzle in communication with said orifice and the opposite side of said valve actuating means, said nozzle discharging gas to said outlet, means mounted for cooperation with said nozzle to control the amount of discharge from the nozzle and thereby the position of said valve actuating means, the nozzle and the nozzle control means being related to allow the discharge of a substantially uniform rate of gas, though the supply and relief valves are closed, a differential pressure sensing element exposed to and responsive to the pressure of the ambient atmosphere for actuating the nozzle control means, said pressure sensing element being rendered inoperable when the desired minimum pressure exceeds the pressure of the ambient atmosphere, and an absolute pressure sensing element responsive to pressure variations within the device for actuating said nozzle control means, said absolute pressure sensing element being operable independently of the pressure of the ambient atmosphere when the desired minimum pressure exceeds the pressure of the ambient atmosphere.

17. A gas flow and pressure control device adapted for disposition in a loop circuit for a pressurized flying suit, said device comprising a body having a gas source inlet, an outlet and an inlet for a loop circuit in communication with each other, a supply valve in communication with the gas source inlet for discharging gas, when open, to said outlet, a resiliently mounted valve actuating diaphragm, having a side thereof in communication with the gas source inlet, connected to the supply valve, a pressure regulator in communication with said side of the diaphragm to provide gas having a predetermined pressure to such side, the opening and closing of the valve depending upon the position of said diaphragm, and a control circuit for maintaining a desired pressure at said outlet with respect to the varying pressure of the ambient atmosphere, and alternately and automatically, for maintaining the pressure independently of varying ambient pressure when the desired minimum pressure at said outlet exceeds the pressure of the ambient atmosphere, said control circuit comprising an orifice in communication with the aforesaid side of the diaphragm, a needle valve adjustably related to the orifice, a nozzle in communication with said orifice and the opposite side of said diaphragm, said nozzle discharging gas to said outlet, a flapper, having an extension, pivotally and resiliently mounted for cooperation with said nozzle to control the amount of discharge from the nozzle and thereby the position of said diaphragm, an ambient pressure sensing diaphragm exposed to and responsive to the pressure of the ambient atmosphere for actuating the flapper, said pressure sensing diaphragm being rendered inoperable when the desired minimum pressure exceeds the pressure of the ambient atmosphere, and an aneroid element responsive to pressure variations within the device for engaging said extension and actuating the flapper, the aneroid element being operable independently of the pressure of the ambient atmosphere and only when the desired minimum pressure exceeds the pressure of the ambient atmosphere.

18. A gas flow and pressure control device adapted for disposition in a loop circuit for a pressurized flying suit, said device comprising a body having a gas source inlet, an outlet and an inlet for a loop circuit in communication with each other, a supply valve in communication with the gas source inlet for discharging gas, when open, to the outlet, a resiliently mounted valve actuating diaphragm, having a side thereof in communication with the gas source inlet, connected to the supply valve, a relief valve connected to said diaphragm, a pressure regulator in communication with said side of the diaphragm to provide gas having a predetermined pressure to such side, the opening and closing of the valves depending upon the position of said diaphragm, and a control circuit for maintaining a desired pressure at said outlet with respect to the varying pressure of the ambient atmosphere, and alternately and automatically, for maintaining the pressure independently of varying ambient pressure when the desired minimum pressure at said outlet exceeds the pressure of the ambient atmosphere, said control circuit comprising an orifice in communication with the aforesaid side of the diaphragm, a needle valve adjustably related to the orifice, a nozzle in communication with said orifice and the opposite side of said diaphragm, said nozzle discharging gas to said outlet, a flapper, having an extension, pivotally and resiliently mounted for cooperation with said nozzle to control the amount of discharge from the nozzle and thereby the position of said diaphragm, an ambient pressure sensing diaphragm exposed to and responsive to the pressure of the ambient atmosphere for actuating the flapper, said pressure sensing diaphragm being rendered inoperable when the desired minimum pressure exceeds the pressure of the ambient atmosphere, and an aneroid element responsive to pressure variations within the device for engaging said extension and actuating the flapper, the aneroid element being operable independently of the pressure of the ambient atmosphere and only when the desired minimum pressure exceeds the pressure of the ambient atmosphere.

19. A gas flow and pressure control device adapted for disposition in a loop circuit for a pressurized flying suit, said device comprising a body having a gas source inlet, an outlet and an inlet for a loop circuit in communication with each other, a supply valve in communication with the gas source inlet for discharging gas, when open, to said outlet, a resiliently mounted valve actuating diaphragm, having a side thereof in communication with the gas source inlet, connected to the supply valve, a pressure regulator in communication with said side of the diaphragm to provide gas having a predetermined pressure to such side, the opening and closing of the valve depending upon the position of said diaphragm, and a control circuit for maintaining a desired pressure at said outlet with respect to the varying pressure of the ambient atmosphere, and alternately and automatically, for maintaining the pressure independently of varying ambient pressure when the desired minimum pressure at said outlet exceeds the pressure of the ambient atmosphere, said control circuit comprising an orifice in communication with the aforesaid side of the diaphragm, a needle valve adjustably related to the orifice, a nozzle in communication with said orifice and the opposite side of said diaphragm, said nozzle discharging gas to said outlet, a flapper, having an extension, pivotally and resiliently mounted for cooperation with said nozzle to control the amount of discharge from the nozzle and thereby the position of said diaphragm, the nozzle and flapper being related to allow the discharge of gas in an amount sufficient for average respiratory needs, though the valve actuating diaphragm is in a position in which the supply valve is closed, an ambient pressure sensing diaphragm exposed to and responsive to the pressure of the ambient atmosphere for actuating the flapper, said pressure sensing diaphragm being rendered inoperable when the desired minimum pressure exceeds the pressure of the ambient atmosphere, and an aneroid element responsive to pressure variations within the device for engaging said extension and actuating said flapper, the aneroid element being operable independently of the pressure of the ambient atmosphere and only when the desired minimum pressure circuit exceeds the pressure of the ambient atmosphere.

References Cited in the file of this patent
UNITED STATES PATENTS

| | | |
|---|---|---|
| 1,311,536 | Smoot | July 29, 1919 |
| 2,523,906 | Holmes | Sept. 26, 1950 |
| 2,755,799 | Marty | July 24, 1956 |
| 2,854,913 | Brahm | Oct. 7, 1958 |

UNITED STATES PATENT OFFICE
CERTIFICATE OF CORRECTION

Patent No. 3,019,804                                         February 6, 1962

Henry A. Miller, Jr.

It is hereby certified that error appears in the above numbered patent requiring correction and that the said Letters Patent should read as corrected below.

Column 4, line 74, for "aneriod" read -- aneroid --; column 11, line 33, for "vary" read -- varying --; column 12, line 49, for "communuication" read -- communication --; colum 18, line 4, strike out "circuit".

Signed and sealed this 24th day of July 1962.

(SEAL)
Attest:

ERNEST W. SWIDER
Attesting Officer

DAVID L. LADD
Commissioner of Patent